(12) United States Patent
Madden et al.

(10) Patent No.: US 8,730,605 B1
(45) Date of Patent: May 20, 2014

(54) WRITE ZERO PHASE START FOR PHASE SYNCHRONIZATION IN BIT PATTERNED RECORDING

(75) Inventors: Michael Madden, Mountain View, CA (US); Gregory Burd, San Jose, CA (US); Qiyue Zou, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 87 days.

(21) Appl. No.: 13/346,941

(22) Filed: Jan. 10, 2012

Related U.S. Application Data

(60) Provisional application No. 61/432,465, filed on Jan. 13, 2011.

(51) Int. Cl.
*G11B 5/09* (2006.01)
*G11B 5/596* (2006.01)

(52) U.S. Cl.
USPC .......................................... 360/51; 360/77.08

(58) Field of Classification Search
None
See application file for complete search history.

(56) References Cited

U.S. PATENT DOCUMENTS

| 7,492,540 B2 * | 2/2009 | Albrecht ........................ 360/51 |
| 2002/0017950 A1 * | 2/2002 | Shimoda ..................... 329/364 |
| 2005/0018337 A1 * | 1/2005 | Tsuchinaga ................... 360/39 |

* cited by examiner

*Primary Examiner* — Daniell L Negron

(57) ABSTRACT

A bit patterned recording system includes a servo channel module configured to recover servo fields written with servo information. A field locator module is configured to locate a field printed to data islands of a medium based on a location of one of the servo fields. The servo islands and the data islands have different spacing. A servo clock has a different phase and frequency than a data clock. A phase error calculator module is configured to estimate a phase error of the data clock based on the field and the data clock. The phase error is used to adjust a phase of the data clock.

18 Claims, 8 Drawing Sheets

WRITE ZERO PHASE START FOR PHASE SYNCHRONIZATION IN BIT PATTERNED RECORDING

CROSS-REFERENCE TO RELATED APPLICATIONS

This application claims the benefit of U.S. Provisional Application No. 61/432,465 filed on Jan. 13, 2011. The disclosure of the above application is incorporated herein by reference in its entirety.

FIELD

The present disclosure relates to magnetic recording systems for bit patterned media.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

There are generally two types of media used in bit patterned recording (BPR). A first BPR media type includes bit islands that are arranged around a track in a uniform manner. In other words, there is no difference between data islands (i.e., bit islands in data field) and servo islands (i.e., bit islands in servo field) and the spacing between the data islands and the servo islands is the same. The frequency and phase of a data clock is the same as the servo clock.

A second BPR media type includes bit islands that are not positioned around the track in a uniform manner. In other words, the data islands and the servo islands are printed with different spacing. Typically the servo islands are printed farther apart than the data islands to provide additional protection against distortions such as inter-symbol-interference (ISI) when reading the servo islands. The frequency and phase of the data clock are different than the servo clock.

Synchronization of the data clock when using the first BPR media type is relatively straightforward since the servo field may be used to directly adjust the phase of the data clock. The servo field for the first BPR media type is typically written at the factory to provide a repeatable reference from which an error between the data clock and the data islands can be determined. Bit positioning accuracy requirements for the second BPR media type are more stringent than those for the first BPR media type because the frequency and phase of the data clock are different than the servo clock.

Referring now to FIG. 1, phase misalignment of the data clock and the data islands on the second BPR media type is shown. If the phase of the data clock is misaligned as shown, writing instants will not coincide with positions of the data islands. As a result, the user data will not be recorded properly to the second BPR media type. The writing errors can be difficult to detect and/or correct. In FIG. 2, proper alignment of the data clock and the data islands is shown.

SUMMARY

A bit patterned recording system includes a servo channel module configured to recover servo fields written with servo information. A field locator module is configured to locate a field printed to data islands of a medium based on a location of one of the servo fields. The servo islands and the data islands have different spacing. A servo clock has a different phase and frequency than a data clock. A phase error calculator module is configured to estimate a phase error of the data clock based on the field and the data clock. The phase error is used to adjust a phase of the data clock.

In other features, the phase error calculator module calculates the phase error using a Discrete Fourier Transform.

In other features, the field includes a write zero phase synchronization field.

In other features, the field locator module further locates the field based on the data clock.

In other features, the field includes a pattern. The phase error calculation module generates the phase error by performing a Discrete Fourier Transform on the pattern. The pattern includes a periodic pattern. The pattern includes a 2T pattern.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The present disclosure describes a bit patterned media recording system and method for correcting phase error of the data clock used when writing data to the second BPR media type. As a result of the corrected phase error, the need for detection and correction of writing errors is reduced.

Figure 1:
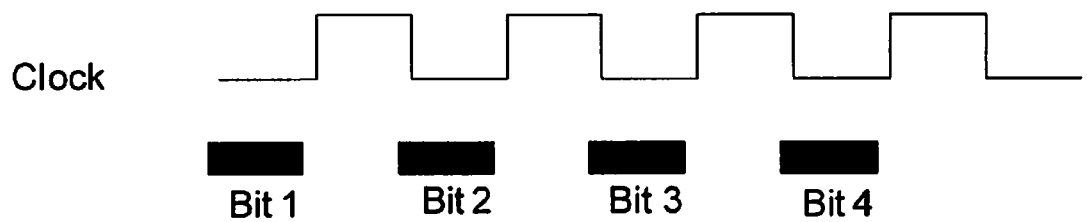
FIG. 1 illustrates misalignment of a data clock relative to data islands.
Figure 2:
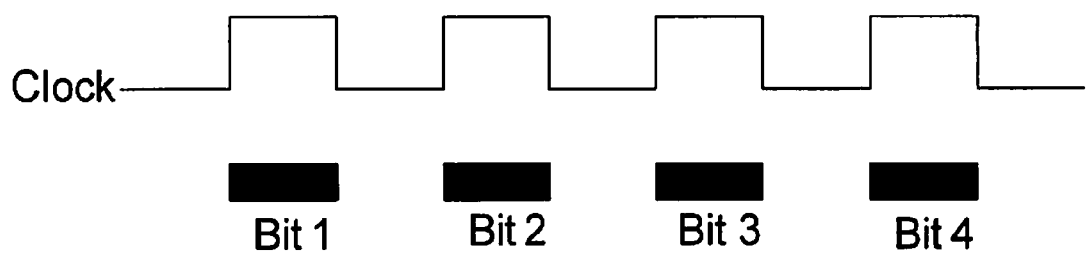
FIG. 2 illustrates alignment of a data clock relative to the data islands.
Figure 3:
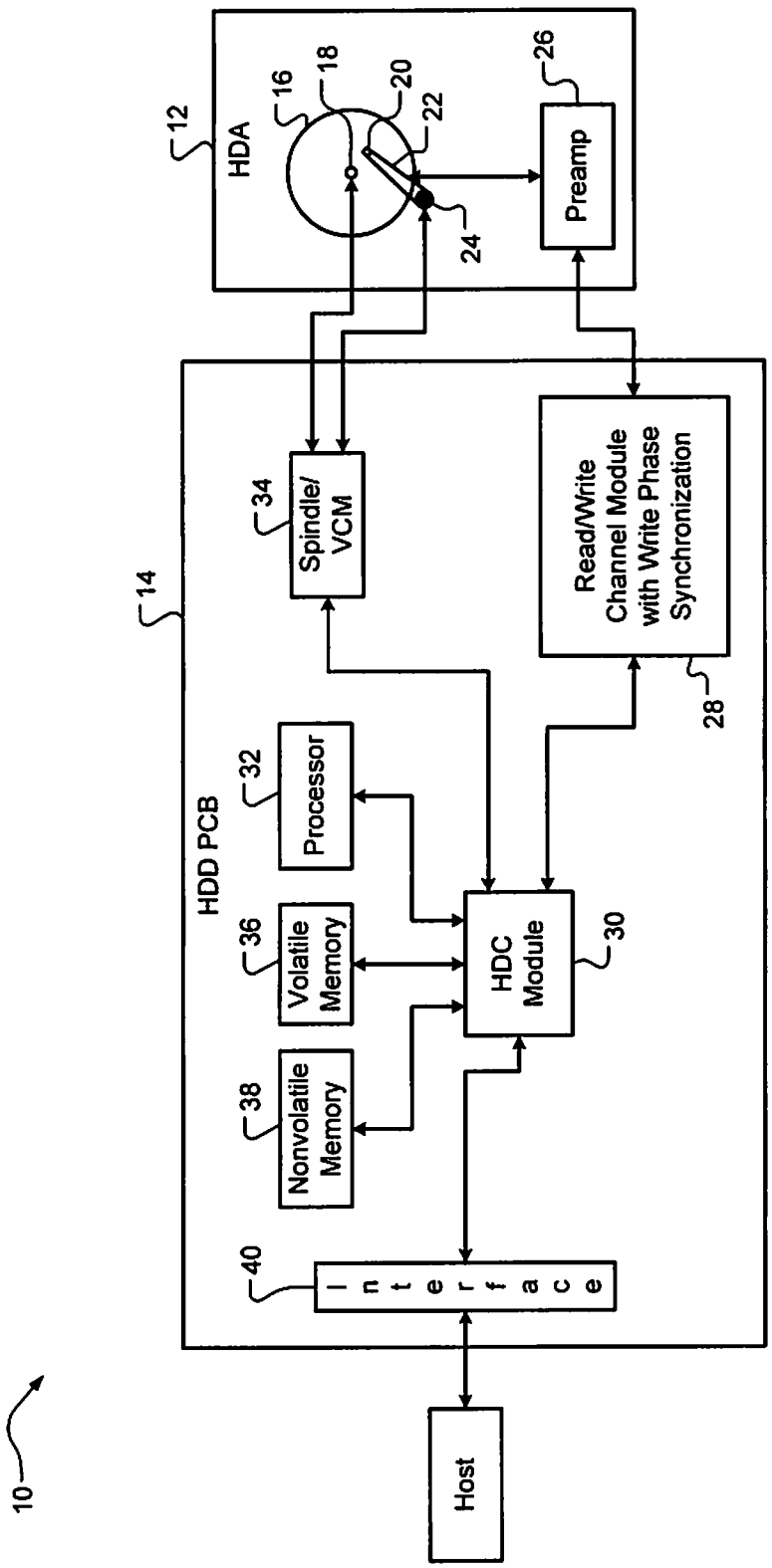
FIG. 3 is a functional block diagram of a hard disk drive system incorporating a read/write channel module with data clock synchronization according to the present disclosure.

Referring now to FIG. 3, a hard disk drive (HDD) system 10 incorporating write phase synchronization according to the present disclosure is shown. The HDD system 10 includes a hard disk assembly (HDA) 12 and a HDD printed circuit board (PCB) 14. The HDA 12 includes one or more circular platters (i.e. disks) 16, which have magnetic surfaces that are used to store data magnetically. The disks 16 may be the first BPR media type or the second BPR media type. The disks 16 are arranged in a stack, and the stack is rotated by a spindle motor 18. At least one read and write head (hereinafter, "head") 20 reads data from and writes data to the magnetic surfaces of the disks 16.

The head 20 includes a write head, such as an inductor, that generates a magnetic field and a read head, such as a magneto-resistive (MR) element, that senses the magnetic field on the disks 16. The head 20 is mounted at a distal end of an actuator arm 22. An actuator, such as a voice coil motor (VCM) 24, moves the actuator arm 22 relative to the disks 16.

The HDA 12 includes a preamplifier 26 that amplifies signals received from and sent to the head 20. The preamplifier 26 generates a write current that flows through the write head of the head 20 when writing data. The write current is used to produce a magnetic field on the magnetic surfaces of the disks 16. Magnetic surfaces of the disks 16 induce low-level analog signals in the read head of the head 20 during reading of the disks 16. The preamplifier 26 amplifies the low-level analog signals and outputs amplified analog signals to a read/write channel module 28.

The HDD PCB 14 includes the read/write channel module 28, a hard disk controller (HDC) 30, a processor 32, a spindle/VCM driver module 34, volatile memory 36, nonvolatile memory 38, and an input/output (I/O) interface 40. The read/write channel module 28 synchronizes a phase of data clock signals with the data islands on the disks 16 during writing, as will be described further below.

During write operations, the read/write channel module 28 may encode the data to increase reliability by using error-correcting codes (ECC) such as run length limited (RLL) code, Reed-Solomon code, etc. The read/write channel module 28 then transmits the encoded data to the preamplifier 26. During read operations, the read/write channel module 28 receives analog signals from the preamplifier 26. The read/write channel module 28 converts the analog signals into digital signals, which are decoded to recover the original data.

The HDC module 30 controls operation of the HDD system 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the head 20 over the disks 16 during read/write operations. Servo, which is stored on the disks 16, ensures that data is written to and read from correct locations on the disks 16.

Figure 4:
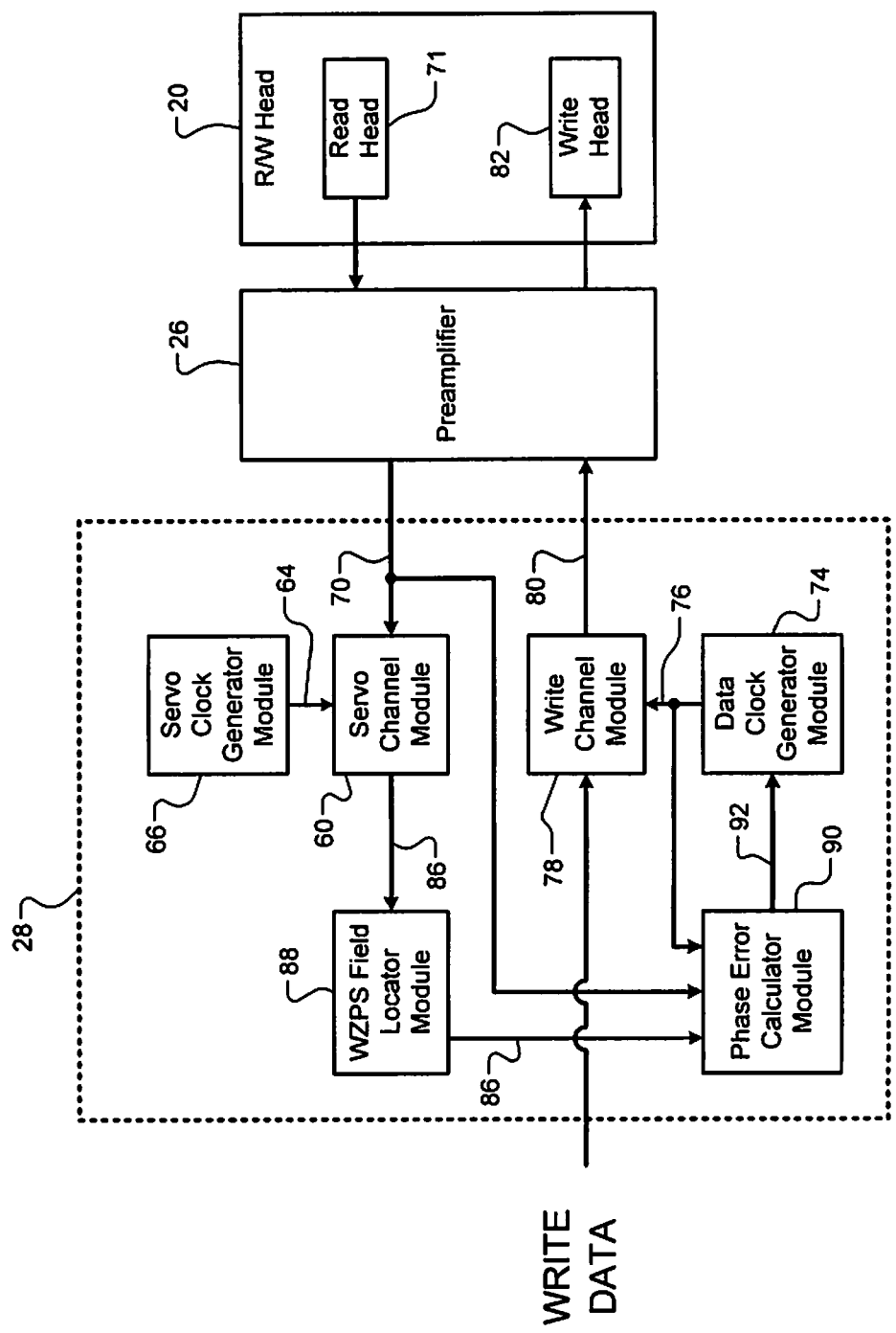
FIG. 4 is a functional block diagram of the read/write channel module with data clock synchronization according to the present disclosure.

Referring now to FIG. 4, an example of an implementation of portions of the read/write channel module 28 with data clock synchronization for writing are shown. A servo channel module 60 receives a servo clock 64 from a servo clock generator module 66 and a read signal 70 from a read head 71 via the preamplifier 26. The read signal 70 is also output to a read channel module (not shown), which outputs a read data signal. A data clock generator module 74 generates and outputs a data clock 76 to a write channel module 78. The write channel module 78 outputs a write signal 80 to a write head 82.

The servo channel module 60 recovers one or more servo fields from the read signal. For example only, the servo fields may include a preamble, a Servo Address Mark (SAM) field, a Gray Code field, a position error signal (PES) field, and a repeatable run out (RRO) field. The servo channel module 60 outputs a field detected signal 86 to a write zero phase start (WZPS) field locator module 88 when a selected one of a plurality of servo fields is detected. The WZPS field locator module 88 identifies a location of a WZPS field based on the location of the selected one of the servo fields and a predetermined offset and outputs a WZPS field locator signal to a phase error calculator module 90. The predetermined offset may be calculated using the servo clock or the data clock. The phase error calculator module 90 calculates the phase error based on content in the WZPS field and the data clock 76. The phase error calculator module 90 outputs a phase error signal 92 to the data clock generator module 74.

When the first BPR media type is used, the data clock can be synchronized by measuring the phase of the data clock when the SAM field is detected. Optionally, synchronization may include measuring the phase of the preamble field immediately preceding the SAM field and combining the phase error with the phase error in the preceding step. The measured phase is compared to the desired phase as dictated by the position of a first data island (which is measured and calibrated a priori). The error is applied to advance or retard the phase of the data clock to make the phase error close to zero.

Figure 5:
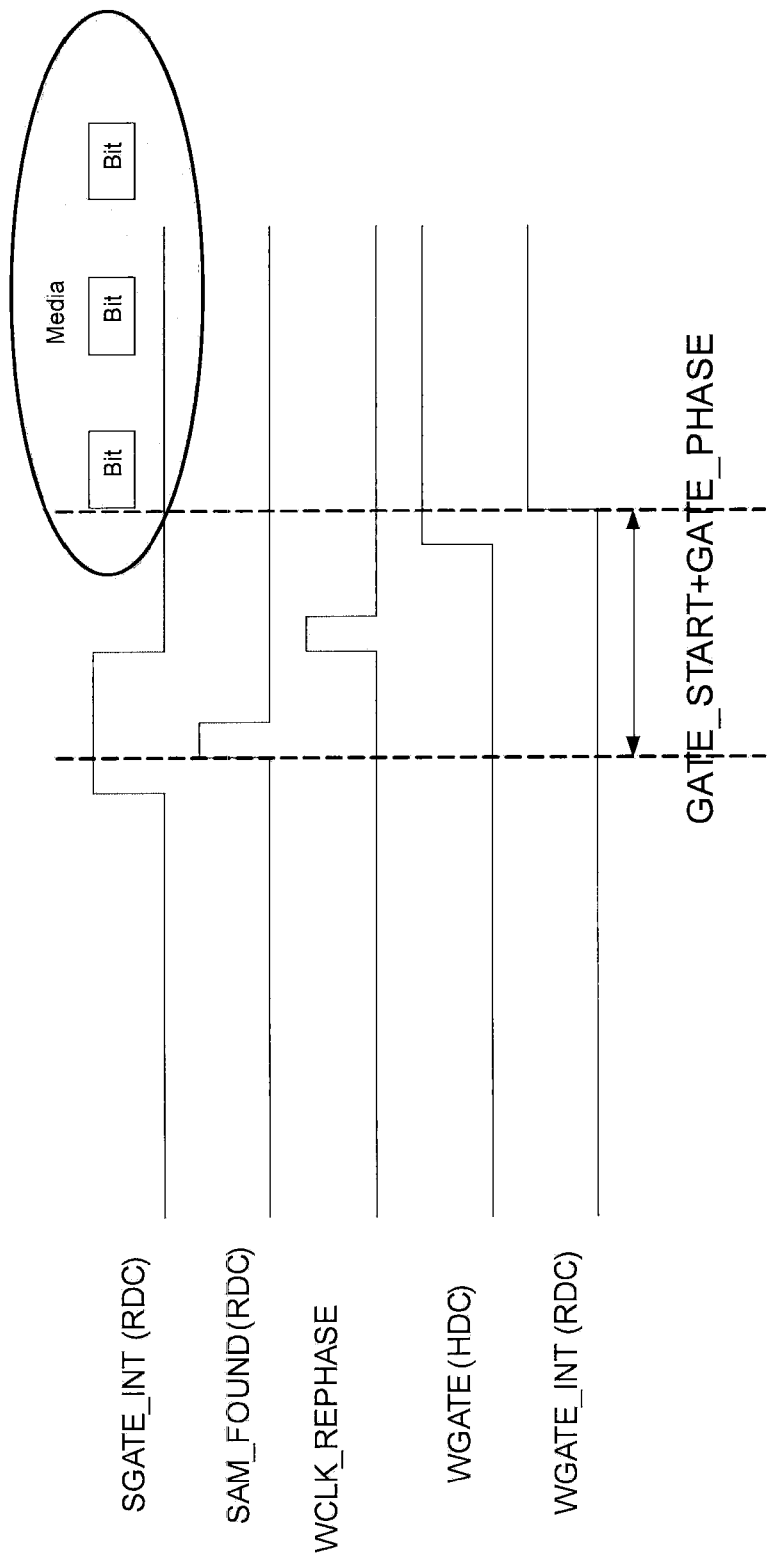
FIG. 5 illustrates signals used for phase synchronization for the first BPR media type.

Referring now to FIG. 5, data clock synchronization for writing when using the first BPR media type may be performed based on a falling edge of internal SGATE (servo gate, i.e., gate signal indicating servo operation) (SGATE_INT). There is a window of a predetermined number of bits (e.g. roughly 200 bits in some examples) from a falling edge of SGATE to a rising edge of WGATE (write gate, i.e., gate signal indicating write operation) due to read/write head delay. However, this approach cannot be used for the second BPR media type. Synchronization of the data clock for the second BPR media type is generally more difficult because the servo field and data fields have non-uniform island spacing, and thus are not phase-coherent. Therefore, the servo field cannot be directly used to estimate and adjust the phase of the data clock.

Figure 6:
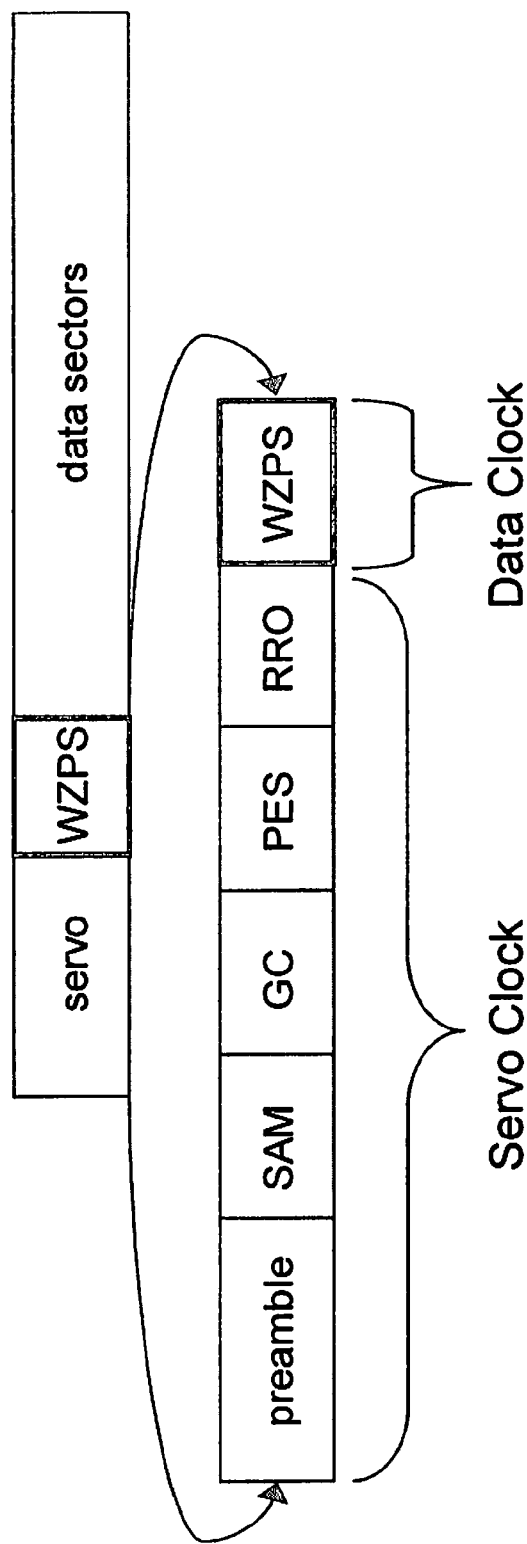
FIG. 6 illustrates a write zero phase synchronization (WZPS) field provided after servo fields for the second BPR media type.

Referring now to FIG. 6, the bit patterned magnetic recording system according to the present disclosure uses a new field, a write zero phase start (WZPS) field, that is written on the data islands and follows the servo fields. For example only, the servo fields may include the preamble, the SAM field, the Gray Code field, the PES field, and the RRO field, although other fields may be used. The WZPS field is used to synchronize the phase of the data clock. The WZPS field may be provided immediately after the servo fields and may be written on the data islands. The WZPS field may contain a repeating pattern such as the "2T" pattern identical to the data preamble (11001100 . . . ), another repeating pattern or other known pattern. The WZPS field is written at the factory, in a similar manner to the RRO field written at the factory.

As an example, if the WZPS field is written as the "2T" pattern, the write phase error with respect to the data clock may be estimated by applying a Discrete Fourier Transform (DFT), obtaining a phase error measurement, and applying the phase error to the data clock during writing.

Figure 7:
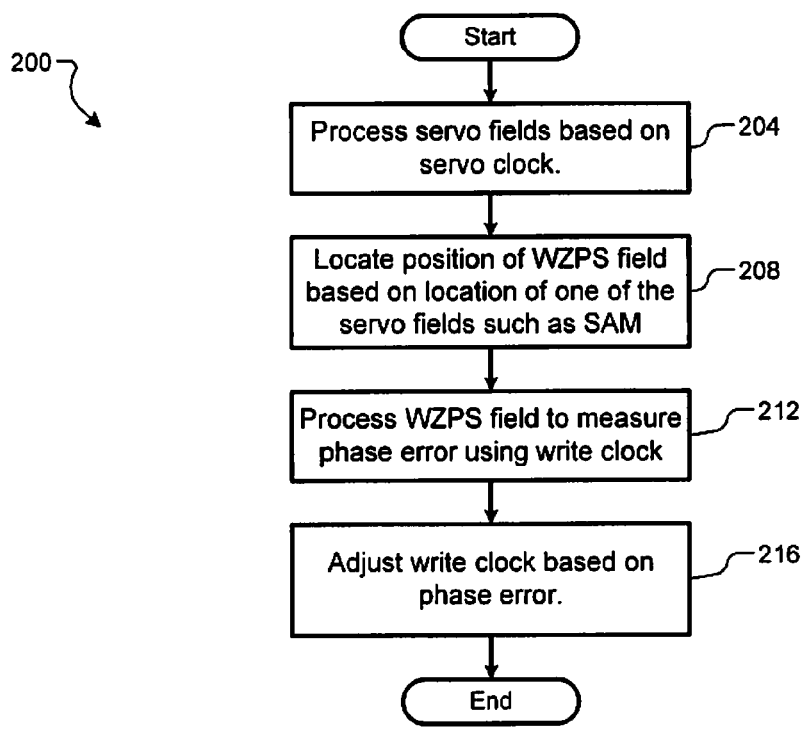
FIG. 7 illustrates a method for correcting phase error for the second BPR media type.

Referring now to FIG. 7, a method 200 for estimating phase error of the data clock 76 during writing is shown. Because the WZPS field is written on the data islands, it may be directly used to measure the write phase error. At 204, the servo channel module processes servo fields based on the servo clock 64. At 208, the position of a first bit of the WZPS field is known by counting edges of the servo clock 64 (or alternately the data clock) after the selected one of the servo fields. For example only, the position of the WZPS field may be calculated based on the position of the SAM field or another one of the servo fields. At 212, the WZPS field is processed to measure the phase error with respect to the data clock 76.

For example only, if the WZPS field includes a tone pattern such as the 2T pattern, the phase error may be estimated by applying a DFT and obtaining the phase response relative to the data clock 76. When the phase error has been estimated, the phase of the data clock is adjusted based on the phase error at 220. In other words, the phase error may be minimized.

Figure 8A:
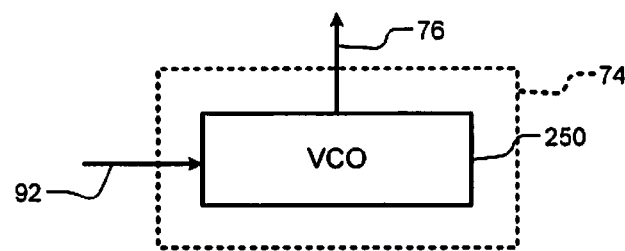
FIGS. 8A and 8B are functional block diagrams of examples of data clock generating modules.
Figure 8B:
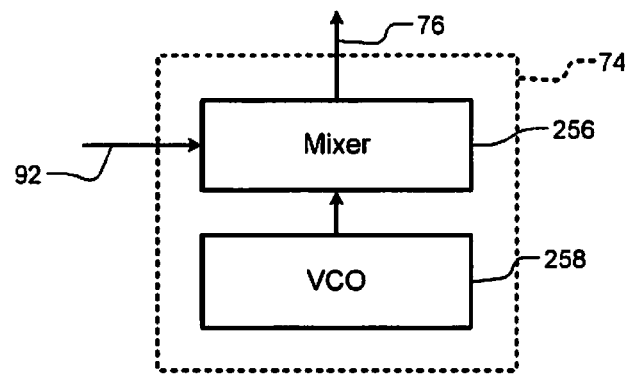

Referring now to FIGS. 8A and 8B, several examples of ways to use the phase error signal 92 to alter the phase of the data clock 76 are shown. In FIG. 8A, the phase of the data clock 76 may be changed by changing the phase of a voltage controlled oscillator (VCO) 250. Alternately in FIG. 8B, the phase of the data clock may be changed by applying the phase error signal 92 to a mixer 256. The mixer 256 receives the output of a VCO 258 and digitally interpolates the output of the VCO 258 to re-phase the data clock 76. After the VCO settling time in FIG. 8A or after the mixer 256 has finished changing the phase of the data clock in FIG. 8B, the write channel is ready to start applying write pulses to the data islands.

In some examples, there is one WZPS field per servo wedge. However in other examples, there may be more than one WZPS field per servo wedge. Typically the WZPS field is written immediately after the servo wedge. However, the WZPS field may also be spaced from the end of the servo wedge (e.g., written with a delay with respect to the end of the servo wedge). In some examples, the WZPS field may be written onto the second BPR media type in the recorded state during media manufacturing, or it may be written to blank islands during factory drive-bring up.

Figure 9:
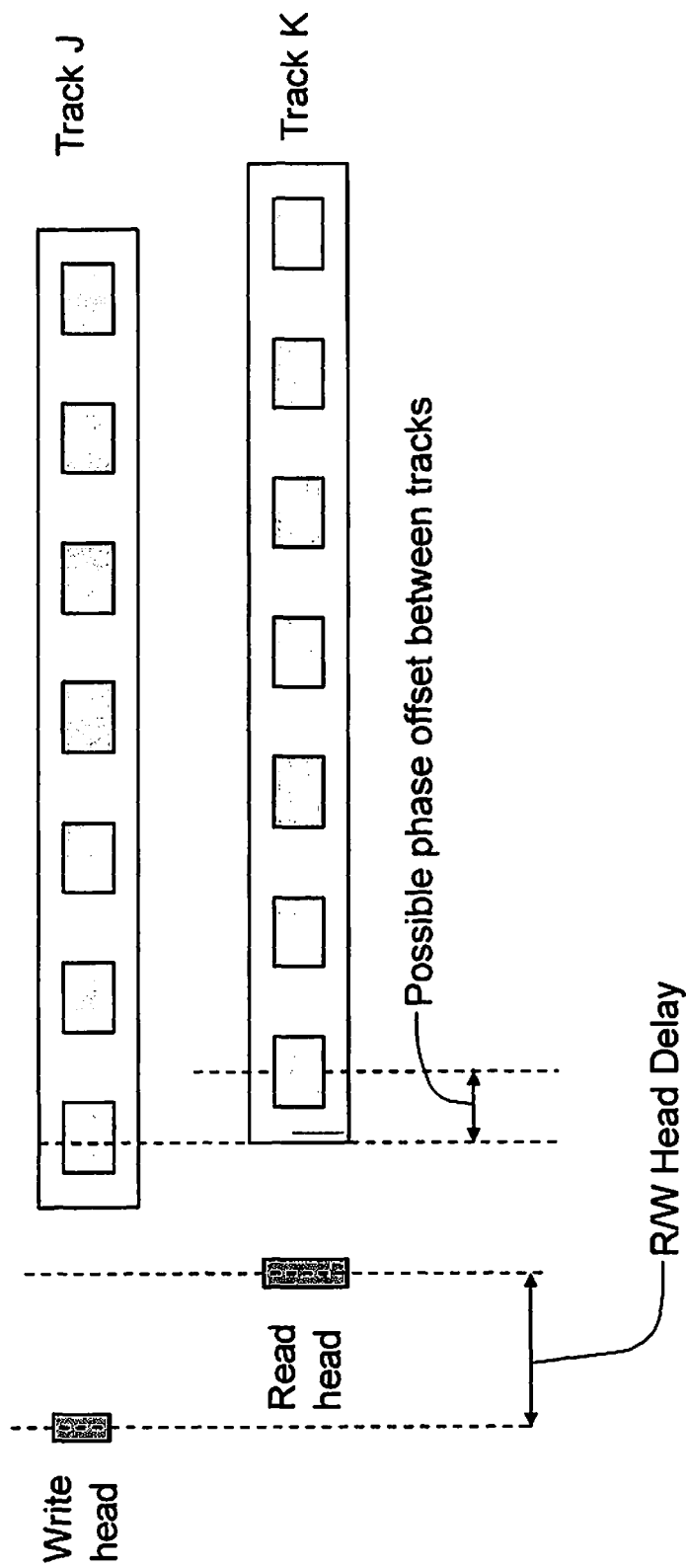
FIG. 9 illustrates synchronizing relative to one track while writing to an adjacent track.

As can be seen in FIG. 9, the read head 71 will generally not be located over the same track as the write head 82 due to read/write head offset. Furthermore, the write head 82 lags the read head 71 in time due to the read/write head delay from placement on the R/W head 20. Thus, when synchronizing the data clock to write on track J, the read head 71 will be reading the WZPS field from track K. Moreover, there will in general be a phase lag between tracks J and K. These offsets and delays are deterministic every time a desired disk position is written. As such, the track offset and phase lag may be measured, calibrated, and stored to memory during factory drive bring-up.

During write process, the read head 71 is phase locked to track K, while the write head 82 is writing on track J. J and K can be adjacent or immediately adjacent tracks. Phase delay between read head 71 and the write head 82 (including any possible track offsets) is calibrated during manufacture.

The description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A bit patterned recording system, comprising:
a servo channel module configured to recover servo fields written with servo information;
a field locator module configured to locate a field printed to data islands of a medium based on a location of one of the servo fields, wherein the field printed to the data islands of the medium includes a write zero phase synchronization field, wherein servo islands and the data islands have different spacing, and wherein a servo clock has a different phase and frequency than a data clock; and
a phase error calculator module configured to estimate a phase error of the data clock based on (i) the field printed to the data islands of the medium and (ii) the data clock, wherein the phase error is used to adjust a phase of the data clock.

2. The bit patterned recording system of claim 1, further comprising a write channel module configured to write data to the data islands of the medium based on the data clock.

3. The bit patterned recording system of claim 1, further comprising a data clock generator module configured to generate the data clock.

4. The bit patterned recording system of claim 3, wherein the data clock generator module includes a voltage controlled oscillator.

5. The bit patterned recording system of claim 3, wherein the data clock generator module further includes a mixer configured to receive the phase error and the data clock and to interpolate the data clock based on the phase error to correct a phase of the data clock.

6. The bit patterned recording system of claim 1, wherein the phase error calculator module calculates the phase error using a Discrete Fourier Transform.

7. The bit patterned recording system of claim 1, wherein the field locator module further locates the field printed to the data islands of the medium based on the data clock.

8. The bit patterned recording system of claim 1, wherein the servo fields include a servo address mark field and wherein the field printed to the data islands of the medium is located a predetermined number of cycles of the servo clock from the servo address mark field.

9. The bit patterned recording system of claim 1, wherein the field printed to the data islands of the medium includes a pattern and wherein the phase error calculation module generates the phase error by performing a Discrete Fourier Transform on the pattern.

10. The bit patterned recording system of claim 9, wherein the pattern includes a periodic pattern.

11. The bit patterned recording system of claim 9, wherein the pattern includes a 2T pattern.

12. A method comprising:

recovering servo fields written with servo information;

locating a field printed to data islands of a medium based on a location of one of the servo fields, wherein the field printed to the data islands of the medium includes a write zero phase synchronization field, wherein servo islands and the data islands have different spacing, and wherein a servo clock has a different phase and frequency than a data clock; and estimating a phase error of the data clock based on (i) the field printed to the data islands of the medium and (ii) the data clock, wherein the phase error is used to adjust a phase of the data clock.

13. The method of claim 12, further comprising writing data to the data islands of the medium based on the data clock.

14. The method of claim 12, wherein the data clock is generated by a voltage controlled oscillator.

15. The method of claim 12, further comprising interpolating the data clock based on the phase error to correct a phase of the data clock.

16. The method of claim 12, wherein locating the field printed to data islands of the medium further comprises locating the field printed to the data islands of the medium further based on the data clock.

17. The method of claim 12, wherein the servo fields include a servo address mark field and wherein the field printed to the data islands of the medium is located a predetermined number of cycles of the servo clock from the servo address mark field.

18. The method of claim 12, wherein the field printed to the data islands of the medium includes a pattern and further comprising generating the phase error by performing a Discrete Fourier Transform on the pattern.

* * * * *